UNITED STATES PATENT OFFICE.

H. POISSONNIER, OF NEW YORK, N. Y.

COMPOSITION FOR SILVERING MIRRORS.

Specification forming part of Letters Patent No. 28,773, dated June 19, 1860.

*To all whom it may concern:*

Be it known that I, HENRY POISSONNIER, of the city, county, and State of New York, have invented a new and Improved Composition for Silvering Mirrors; and I do hereby declare that the following is a full, clear, and exact description of the same.

The object of my invention is to produce a composition which not only obviates the danger attended with the use of the usual mercurial composition, but which at the same time enables me to produce cheaper and more durable mirrors than by the ordinary method of silvering.

My invention consists in a certain composition of nitrate of silver, tartrate of potassa, and liquid ammonia mixed together and diluted with a sufficient quantity of water, as will be hereinafter more fully explained, so that when said mixture is spread on a glass plate it adheres to the same and forms a precipitate which produces the desired effect.

My composition consists of nitrate of silver, ten parts; tartrate of potassa, five parts; liquid ammonia, one part, diluted with a sufficient quantity of pure water, and I use one quart of water for three-fourths ounce of the composition.

In order to prepare the composition, I divide the water in two equal parts, and in one part I dissolve the nitrate of silver, in the other the tartrate of potassa. After both have been completely dissolved I mix them in a glass vessel, and the mixture assumes a milky appearance. By adding a very small quantity (about thirty drops) of liquid ammonia the mixture becomes clear, and a metallic precipitate is formed. The mixture is now well stirred with a glass rod, and it is filtered through paper, which gives a clear and colorless liquid, forming the composition which I use for silvering the mirrors.

In order to apply this mixture, the glass plate ought to be well polished and perfectly clean and placed in a horizontal plane. Sufficient of the silvering-liquid is now poured on the plate to cover all its parts, and the temperature in the apartment is raised to about 100°. After a lapse of about fifteen minutes the silver adheres to the glass, and the operation is finished. The glass plate is now placed at an angle whereby the surplus liquid is caused to flow off, and after all the surplus liquid has been collected in a suitable vessel the plate is well washed with clean water. When dry the silver is covered by white varnish, and the mirror is now fully protected against any change of temperature, against moisture, and against all the inconveniences generally arising from transporting mirrors or looking-glasses from place to place.

Mirrors prepared by silvering with my composition can be sold cheaper than ordinary mirrors, and they have a superior brightness and clearness. They are not subjected to the many inconveniences arising from handling and the running off of the mercury, and they can be used in twenty-four hours after the mixture has been applied, whereas it takes at least ten days before a glass covered with mercury can be used. My composition also admits of silvering angular or curved surfaces, which is impossible with mercury, and the workmen that have to handle the composition are not exposed to the dangers arising from the use of mercury.

Similar compositions previously employed for superseding the mercury have failed, because they have been insufficient to produce the desired effect at a price at least not lower than the old method. With my composition superior mirrors can be produced at a lower price than by the old method, because the tartrate of potassa, in coming in contact with a small quantity of silver in the form of nitrate, forms a precipitate which could not be produced by any of the compositions which have heretofore been employed for the same purpose.

What I claim as new, and desire to secure by Letters Patent, is—

The employment of tartrate of potassa mixed with nitrate of silver and liquid ammonia, about in the proportion herein specified, for the purpose set forth.

H. POISSONNIER.

Witnesses:
M. M. LIVINGSTON,
B. GIROUD.